Patented Nov. 12, 1935

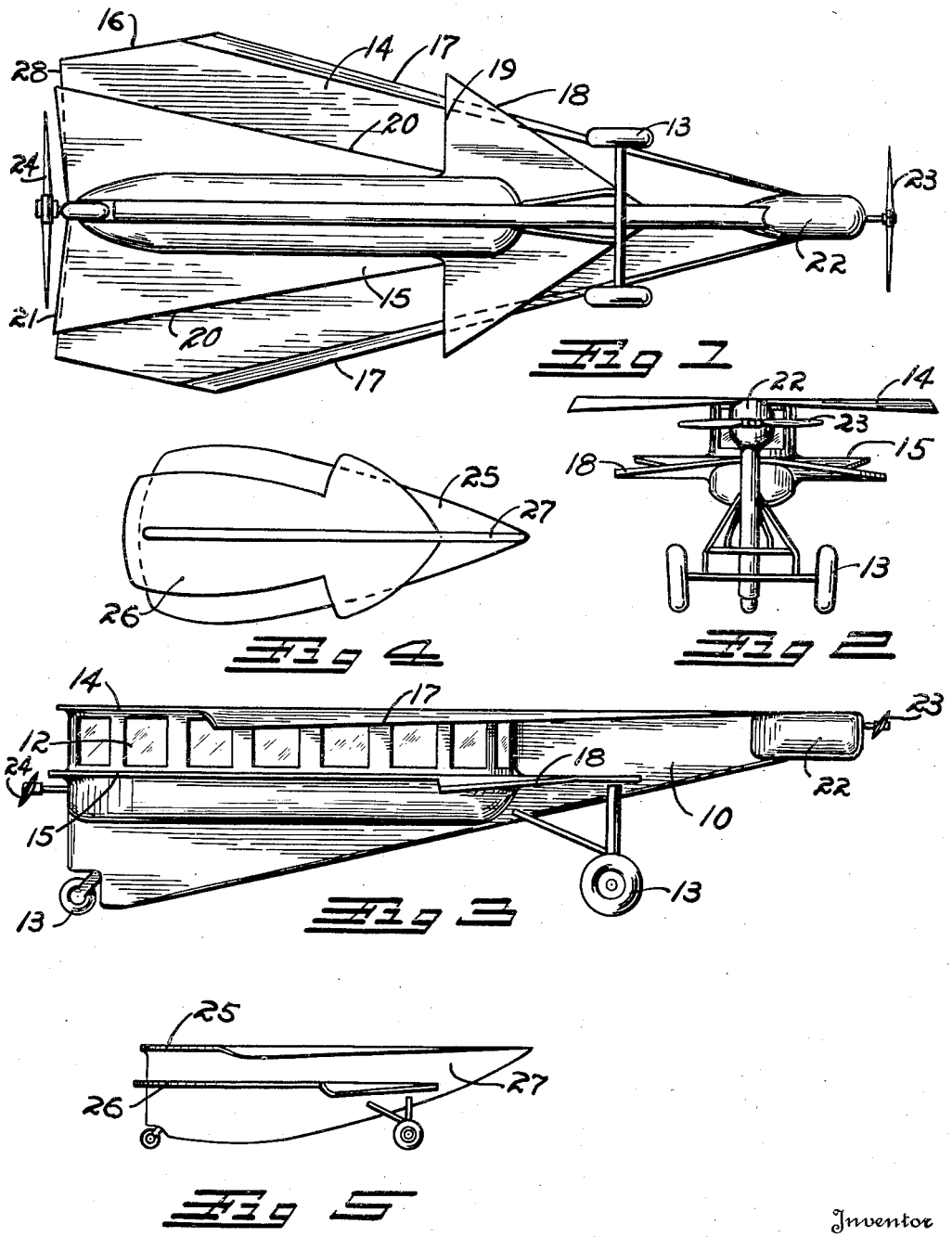

2,020,616

UNITED STATES PATENT OFFICE 2,020,616

AIRCRAFT

Severyn I. Molicki, Denver, Colo.

Application December 26, 1933, Serial No. 703,912

2 Claims. (Cl. 244—14)

This invention relates to aircraft, and has for its principal object the provision of a sustaining surface design which will result in more efficient lifting qualities and greater stability than the present lifting surfaces.

This invention relates more particularly to aircraft of the type illustrated in applicant's copending application, Serial No. 686,075 over which this invention is designed as an improvement.

Other objects and advantages reside in the detail construction of the invention, which is designed for simplicity, economy, and efficiency. These will become more apparent from the following description.

In the following detailed description of the invention reference is had to the accompanying drawing which forms a part thereof. Like numerals refer to like parts in all views of the drawing and throughout the description.

In the drawing:

Fig. 1 is a bottom view of an aircraft in which the principles of this invention are embodied.

Fig. 2 is a front view thereof.

Fig. 3 is a side view thereof.

Fig. 4 is an outline bottom view illustrating an alternate plane outline.

Fig. 5 is a side view of the alternate form of Fig. 4.

In the illustrated embodiment of the invention, a fuselage is indicated at 10 with its passenger carrying compartment at 12. Suitable landing wheels 13 are provided for the fuselage. The lifting surfaces comprise: an upper wing 14, and a lower wing 15. The upper wing preferably extends entirely across the top of the fuselage 10, but may be formed to extend outwardly from each side thereof if preferred. The lower wing 15 extends oppositely outward from each side of the fuselage 10 below the upper wing 14.

The upper wing 14 consists of a pointed surface with its apex toward the bow of the plane. From this apex, the total wing surface gradually widens at an acute angle and reaches its greatest width approximately ⅘ of the length of the fuselage 10. It then tapers inwardly to form converging trailing edges 16 and a rear trailing edge 28. This construction provides two angularly flaring leading edges 17 which are preferably rolled downwardly as indicated in Fig. 3.

The lower wing 15 is relatively shorter than the upper wing 14, and preferably begins approximately ¼ the length from the bow. It has a spear-shaped or arrow-shaped outline with a tail portion and a head portion. The head portion extends at a comparatively abrupt angle to provide two forward leading edges 18 thence inwardly to provide two first trailing edges 19. It again gradually widens to form the tail portion and to provide two second leading edges 20 terminating at the stern of the fuselage in inwardly extending second trailing edges 21. This provides an outline design for the lower wing of an arrow-like appearance with the first leading and trailing edges 18 and 19 forming the head portion thereof and the second leading and trailing edges 20 and 21 forming the tail portion thereof. The entering edges 18 are preferably inclined downwardly slightly toward their tips, as shown in Fig. 3, which preferably extend slightly beyond the upper wing surface 14.

The fuselage 10 is preferably formed with an inclined bottom terminating at an apex corresponding to the apex of the upper wing 14. The plane may be driven in any desired manner, either from a tractor propeller at the front or a pusher propeller at the back, or both. As illustrated, an engine nacelle 22 is formed in the front of the fuselage 10 to receive an engine for driving a tractor propeller 23. A second engine may be carried in the fuselage for driving a pusher propeller 24.

Models built with the above described wing surfaces have demonstrated extraordinary lifting qualities and stability, far exceeding the present lateral wing placement.

In the preferred form of the improved plane, the edges are shown straight. It is conceivable, however, that they could be curved without losing the qualities of the plane. Such an adaptation is illustrated in Figs. 4 and 5 in which an upper wing surface 25 is shown with curved leading and trailing edges. A lower wing surface 26 is illustrated also with curved edges simulating the outline of the previously described lower wing. In this form the bottom of the fuselage, which is indicated at 27, is also shown curved. The form of Fig. 5 functions similarly to the form of Figs. 1, 2, and 3.

The invention has been described as applied to complete commercial ship. It may also be manufactured on a small scale as a toy glider for children with the wing surfaces and fuselage formed of relatively stiff card board with the passenger cabin outlines printed or lithographed thereon. Such models when projected through the air by hand fly freely and evenly for comparatively long distances and form an attractive and instructive toy.

It is desired to call attention to the fact that the design of this plane provides a very narrow total width so that it can be placed into small hangars through comparatively narrow doors. The narrow width also decreases the head resistance, reduces the necessary power and increases the possible speed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. An airplane comprising: a fuselage substantially level along its top and inclined upwardly along its bottom to an apex at the front; a pair of wings extending oppositely outward along said top and terminating in an apex common with the apex of said fuselage and a second pair of wings having an arrow shaped surface with the apex directed toward the bow of the plane and projecting equally on each side of the longitudinal axis of said plane, said surface having a head and tail portions; leading edges on both portions extending outwardly and rearwardly; inwardly extending trailing edges on both portions, the surface of the head portion extending rearwardly downward; and the surface of the tail portion extending forwardly downward.

2. An airplane comprising: a fuselage; an upper wing surface extending oppositely outward along the top of said fuselage, said surfaces widening from an apex at the bow of said fuselage to its greatest width adjacent the stern of said fuselage, thence narrowing to a trailing edge, the leading angular edges of said surface being turned downwardly, the remainder of said surface being substantially flat; a lower wing surface projecting oppositely outward from the sides of said fuselage below said upper wing surface, said lower wing surface widening from an apex positioned to the rear of the apex of the upper wing surface to its greatest width at substantially the middle of said fuselage, thence narrowing substantially to the sides of said fuselage, thence widening to a trailing edge positioned substantially below the trailing edge of said upper wing surface, the forward leading edge of said lower wing surface being turned downwardly as the point of greatest width is approached.

SEVERYN I. MOLICKI.